(12) United States Patent
Gannu et al.

(10) Patent No.: US 8,166,161 B1
(45) Date of Patent: Apr. 24, 2012

(54) SYSTEM AND METHOD FOR ENSURING PRIVACY WHILE TAGGING INFORMATION IN A NETWORK ENVIRONMENT

(75) Inventors: Satish K. Gannu, San Jose, CA (US); Jayashree Jagannath, Sunnyvale, CA (US); Deepti Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 12/571,421

(22) Filed: Sep. 30, 2009

(51) Int. Cl.
*G06F 15/16* (2006.01)
*G06F 12/00* (2006.01)

(52) U.S. Cl. ...................................... 709/224; 709/206

(58) Field of Classification Search .......... 709/206–207, 709/225–229, 250
See application file for complete search history.

(56) References Cited

U.S. PATENT DOCUMENTS

| | | | |
|---|---|---|---|
| 5,961,582 A | 10/1999 | Gaines | |
| 6,012,053 A | 1/2000 | Pant et al. | |
| 6,026,388 A | 2/2000 | Liddy et al. | |
| 6,697,793 B2 | 2/2004 | McGreevy | |
| 7,350,227 B2 | 3/2008 | McGrew et al. | |
| 7,457,808 B2 | 11/2008 | Gaussier et al. | |
| 7,509,491 B1 | 3/2009 | Wainner et al. | |
| 7,809,714 B1 | 10/2010 | Smith | |
| 7,818,215 B2 | 10/2010 | King et al. | |
| 7,913,176 B1 * | 3/2011 | Blattner et al. ............... | 715/758 |
| 2003/0033288 A1 | 2/2003 | Shanahan et al. | |
| 2005/0060283 A1 | 3/2005 | Petras et al. | |
| 2005/0108001 A1 | 5/2005 | Aarskog | |
| 2006/0150253 A1 | 7/2006 | Feuerstein et al. | |
| 2007/0244892 A1 | 10/2007 | Narancic | |
| 2008/0065892 A1 * | 3/2008 | Bailey et al. ................... | 713/171 |
| 2008/0091670 A1 | 4/2008 | Ismalon | |
| 2008/0154873 A1 * | 6/2008 | Redlich et al. ..................... | 707/5 |
| 2008/0244740 A1 * | 10/2008 | Hicks et al. ..................... | 726/22 |
| 2009/0182727 A1 | 7/2009 | Majko | |
| 2009/0226870 A1 | 9/2009 | Minotti | |

(Continued)

FOREIGN PATENT DOCUMENTS

WO  WO02/42940  5/2002

(Continued)

OTHER PUBLICATIONS

U.S. Appl. No. 12/571,390, filed Sep. 30, 2009, entitled "System and Method for Generating Vocabulary From Network Data," Inventor(s): Thangavelu Arumugam, et al.

(Continued)

*Primary Examiner* — Zarni Maung
(74) *Attorney, Agent, or Firm* — Patent Capital Group (57) ABSTRACT

A method is provided in one example and includes receiving data propagating in a network environment and verifying whether the data is associated with a first end user represented in a registered user list. The method also includes verifying a ratification of a policy associated with data monitoring related to the first end user. Selected words can be identified within the data based on a whitelist, where the whitelist includes a plurality of designated words to be tagged. A resultant composite of the selected words that are tagged is generated. In more specific embodiments, the method can include verifying whether the data is associated with a business email domain. In still other embodiments, the method can include verifying whether the data is associated with a business uniform resource locator (URL) domain.

20 Claims, 5 Drawing Sheets

U.S. PATENT DOCUMENTS

| | | | |
|---|---|---|---|
| 2009/0254572 A1* | 10/2009 | Redlich et al. | 707/10 |
| 2010/0010968 A1* | 1/2010 | Redlich et al. | 707/3 |
| 2010/0057815 A1 | 3/2010 | Spivack et al. | |
| 2010/0250547 A1 | 9/2010 | Grefenstette et al. | |
| 2010/0280985 A1 | 11/2010 | Duchon et al. | |
| 2011/0077936 A1* | 3/2011 | Arumugam et al. | 704/9 |

FOREIGN PATENT DOCUMENTS

| | | |
|---|---|---|
| WO | WO2011/041443 | 4/2011 |

OTHER PUBLICATIONS

U.S. Appl. No. 12/471,404, filed Sep. 30, 2009, entitled "System and Method for Generating Personal Vocabulary from Network Data," Inventor(s): Satish K. Gannu, et al.

U.S. Appl. No. 12/571,414, filed Sep. 30, 2009, entitled "System and Method for Providing Speech Recognition Using Personal Vocabulary in a Network Environment," Inventor(s): Satish K. Gannu, et al.

U.S. Appl. No. 12/571,426, filed Sep. 30, 2009, entitled "System and Method for Controlling an Exchange of Information in a Network Environment," Inventor(s): Satish K. Gannu, et al.

PCT Notification of Transmittal (1 page) of the International Search Report (3 pages), and Written Opinion of the International Searching Authority, or the Declaration (6 pages) mailed Jan. 12, 2011 for PCT/US2010/050762.

Chen, Hsinchun, et al., "A Concept Space Approach to Addressing the Vocabulary Problem in Scientific Information Retrieval; An Experiment on the Worm Community System," Journal of the American Society for Information Science Wiley for Asis USA, vol. 48, No. 1, Jan. 1997, XP002614340, ISSN: 0002-8231; pp. 17-31.

Chen, Rung-Ching, et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.

Sethy, Abhinav, et al., "Building Topic Specific Language Models from Webdata Using Competitive Models," $9^{th}$ European Conference on Speech Communication and Technology , Eurospeech Interspeech 2005 International Speech and Communication Association Fr., 2005, pp. 1293-1296; XP 002614341; http://sail.usc.edu/publications/sethy-euro2005.pdf.

U.S. Appl. No. 13/088,974, filed Apr. 18, 2011, entitled "System and Method for Providing Augmented Data in a Network Environment," Inventor(s): Satish K. Gannu et al.

U.S. Appl. No. 13/098,112, filed Apr. 29, 2011 entitled "System and Method for Evaluating Visual Worthiness of Video Data in a Network Environment", Inventor(s): Deepti Patil et al.

U.S. Appl. No. 13/098,434, filed Apr. 30, 2011 entitled"System and Method for Media Intelligent Recording in a Network Environment", Inventor(s): Ashutosh A. Malegaonkar et al.

Virage, "Audio Analysis," Autonomy Virage, © 2009 Autonomy Virage, 1 page http://www.virage.com/security-and-surveillance/functions/audio-analysis/index.htm Virage, "Understanding Video," Autonomy Virage, © 2009 Autonomy Virage, 5 pages http://www.virage.com/rich-media/technology/understanding-video/index.htm.

U.S. Appl. No. 13/160,701, filed Jun. 15, 2011 entitled "System and Method for Discovering Videos," Inventor(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

Caslon Analytics Echelon Note: Overview, May 2006, 6 pages; printed Sep. 30, 2009 http://www.caslon.com.au/echelonnote.htm.

Andreas Hess, et al, "From Web 2.0 to Semantic Web: A Semi-Automated Approach," 15 pages; printed Sep. 30, 2009; http://www.andreas-hess.info/publications/hess-cisweb08.pdf.

Wikipedia, "Homophone," 3 pages; printed Sep. 30, 2009; http://en.wikipedia.org/wiki/Homophone.

R. Billi et al., "Interactive Voice Technology at Work: The CSELT Experience," $2^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.

Wikipedia, "International Phonetic Alphabet," 19 pages; printed Sep. 30, 2009; http://en.wikipedia.org/wiki/International_Phonetic_Alphabet.

"The LNTS Leap: Phoneme Recognition," 2 pages; printed Sep. 30, 2009; http://www.Intstech.com.

NSA Watch, "Other Surveillance Network: Governmental Surveillance Agencies," 2 pages; printed Sep. 30, 2009; http://www.nsawatch.org/networks.html.

Nexidia, "Audio and Speech Analytics Software," 1 page; printed Sep. 30, 2009; http://www.nexidia.com.

Ronnie W. Smith, "Performance Measures for the Next Generation of Spoken Natural Language Dialog Systems," pp. 37-40; http://acl.ldc.upenn.edu/W/W97/W97-0607.pdf.

Wikipedia, "Phoneme," 7 pages; printed Sep. 30, 2009; http://en.wikipedia.org/wiki/Phoneme.

N. S. Jadhav and I.N. Dwivedi, "Social computing based personal vocabulary building," 5 pages; printed Sep. 30, 2009; http://www.priorartdatabase.com/IPCOM/000173550/.

Carnegie Mellon University, "Speech at CMU," 4 pages; printed Sep. 30, 2009; http://www.speech.cs.cmu.edu/speech/.

Professor Anita Wasilewska, CSE 634—Data Mining: Text Mining; 85 pages; www.cs.sunysb.edu/~cse634/presentations/TextMining.pdf.

Trampoline Systems, "Navigation," 2 pages; printed Sep. 30, 2009; www.trampolinesystems.com.

Pete Swabey, "Making the Invisible Visible," 2 pages; Sep. 23, 2009; http://www.trampolinesystems.com/news/in+the+news/archive/2009/59.

WebChoir Products—Personal Vocabulary Tools, "Personal Tools," 1 page; printed Sep. 30, 2009 http://www.webchoir.com/products/ptt.html.

Grimes, Seth, "Sentiment Analysis: Opportunities and Challenges," Beye Network; Jan. 22, 2008; 6 pages; http://www.b-eye-network.com/view/6744.

iLogos v1.5 download (win); 4 pages. [Retrieved and printed on May 28, 2010] from http://www.phil.cmu.edu/projects/argument_mapping/.

Maybury, Mark et al., "Enterprise Expert and Knowledge Discovery," MITRE Technical Papers, The MITRE Corporation, Sep. 2000, 11 pages; http://www.mitre.org/worl/tech_papers_00/maybury_enterprise/maybury_enterprise.pdf Moorthi, Y. L. R., "Have Breakfast or Be Breakfast," Wall Street Journal, Feb. 8, 2010, 2 pages; http://online.wsj.com/article/SB126465641868236415.html#printMode.

Oliveira, Bruno et al., "Automatic Tag Suggestion Based on Resource Contents," Knowledge Engineering: Practice and Patterns, Lecture Notes in Computer Science, 2008, vol. 5268/2008, DOI:10.1007/978-3-54 [Abstract Only, 1 page]; http://www.springerlink.com.content/008w50405265r177/.

Trant, Jennifer, "Studying Social Tagging and Folksonomy: A Review and Framework," Jan. 2009, 10(1) Journal of Digital Information; 42 pages; http://dlist.sir.arizona.edu/arizona/handle/10150/105375.

U.S. Appl. No. 12/971,852, filed Dec. 17, 2010 entitled "System and Method for Providing Argument Maps Based on Activity in a Network Environment," Inventor(s): Deepti Patil, et al.

U.S. Appl. No. 12/971,946, filed Dec. 17, 2010 entitled "System and Method for Providing Feeds Based on Activity in a Network Environment," Inventor(s): Satish K. Gannu, et al.

Ohl, Ricky, "Computer Supported Argument Visualisation: Modelling Wicked Problems," Ph.D. Thesis, Australian Digital Theses Program, Feb. 2008; 431 pgs.; http://gu.edu.au:8080/adt-root/public/adt-QGU20090724.155249/index.html.

U.S. Appl. No. 12/762,194, filed Apr. 16, 2010, entitled "System and Method for Deducing Presence Status from Network Data," Inventor(s): Thangavelu Arumugam, et al.

U.S. Appl. No. 12/778,899, filed May 12, 2010, entitled "System and Method for Deriving User Expertise Based on Data Propagating in a Network Enviroment," Inventor(s): Virgil N. Mihailovici, et al.

U.S. Appl. No. 12/475,486, filed Jun. 3, 2009, entitled "Authentication via Monitoring," Inventor(s): David McGrew and Sandeep Rao.

Nortel Networks Wireless Solutions (A. Silver, J. Larkins, D. Stringer), "Unified Network Presence Management," A White Paper, © 2000, 6 pages, www.mobilein.com/UNPM.pdf.

W.A. Montgomery, et al., "Network Intelligence for Presence Enhanced Communication," SPIRITS Working Group, May 2002, 9 pages, http://ietfreport.isoc.org/all-ids/draft-montgomery-copeland-presence-spirits-00.txt.

J. Kohl and C. Neuman, The Kerberos Network Authentication Service (V5), Network Working Group, RFC 1510, 09.1993, 105 pages, http://www.ietf.org/rfc/rfc1510

Lancope, "Stealth Watch," Revolutionize the Way You View Your Network, © 2009, 8 pages http://storage.pardot.com/2382/9637/StealthWatch_System_Family_Brochure.pdf.

E. Horvitz, et al., "Coordinate: Probabilistic Forecasting of Presence and Availability," 2002, 10 pages, ftp://ftp.research.microsoft.com/pub/ejh/coordinate.pdf.

Andreas Hess, et al., "Multi-Value Classification of Very Short Texts," 8 pages, printed on May 12, 2010; http://www.andreas-hess.info/publications/hess-ki08.pdf.

U.S. Appl. No. 13/182,862 filed Jul. 14, 2011 entitled "System and Method for Deriving user Expertise Based on Data Propagating in a Network Environment," Inventor(s): Satish K. Gannu, et al.

Lacher, Martin S., et al., "On the Integration of Topic Maps and RDF Data," Extreme Markup Languages 2001, 14 pages.

Rosella Data Mining & Database Analytics, "Web Search and Web Navigation Pattern Analyzer," 3 pages; printed Jul. 25, 2011; http://222.roselladb.com/surf-pattern-analyzer.htm.

Wang, Xuerui, et al., "Topics over Time: A NonMarkov Continuous Time Model of Topical Trends," KDD'06, Aug. 20-23, 2006, 10 pages.

* cited by examiner

SYSTEM AND METHOD FOR ENSURING PRIVACY WHILE TAGGING INFORMATION IN A NETWORK ENVIRONMENT

TECHNICAL FIELD

This disclosure relates in general to the field of communications and, more particularly, to ensuring privacy while tagging information in a network environment.

BACKGROUND

The field of communications has become increasingly important in today's society. In particular, the ability to effectively gather, associate, and organize information presents a significant obstacle for component manufacturers, system designers, and network operators. This obstacle is made even more difficult due to end user privacy issues, which seem ubiquitous in today's corporate environments. As new communication platforms and technologies become available, new protocols should be developed in order to optimize the use of these emerging protocols. Some issues have arisen in data monitoring scenarios in which content (sought to be intelligently organized) encroaches on the privacy of end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving data propagating in a network environment and verifying whether the data is associated with a first end user represented in a registered user list. The method also includes verifying a ratification of a policy associated with data monitoring related to the first end user. Selected words can be identified within the data based on a whitelist, where the whitelist includes a plurality of designated words to be tagged. A resultant composite of the selected words that are tagged is generated. In more specific embodiments, the method can include verifying whether the data is associated with a business email domain. In still other embodiments, the method can include verifying whether the data is associated with a business uniform resource locator (URL) domain. If the data includes one or more terms of a restricted term list, then one or more words in the data are not tagged. If the data is encrypted or password protected, it is not tagged and is discarded.

Example Embodiments

Figure 1A:
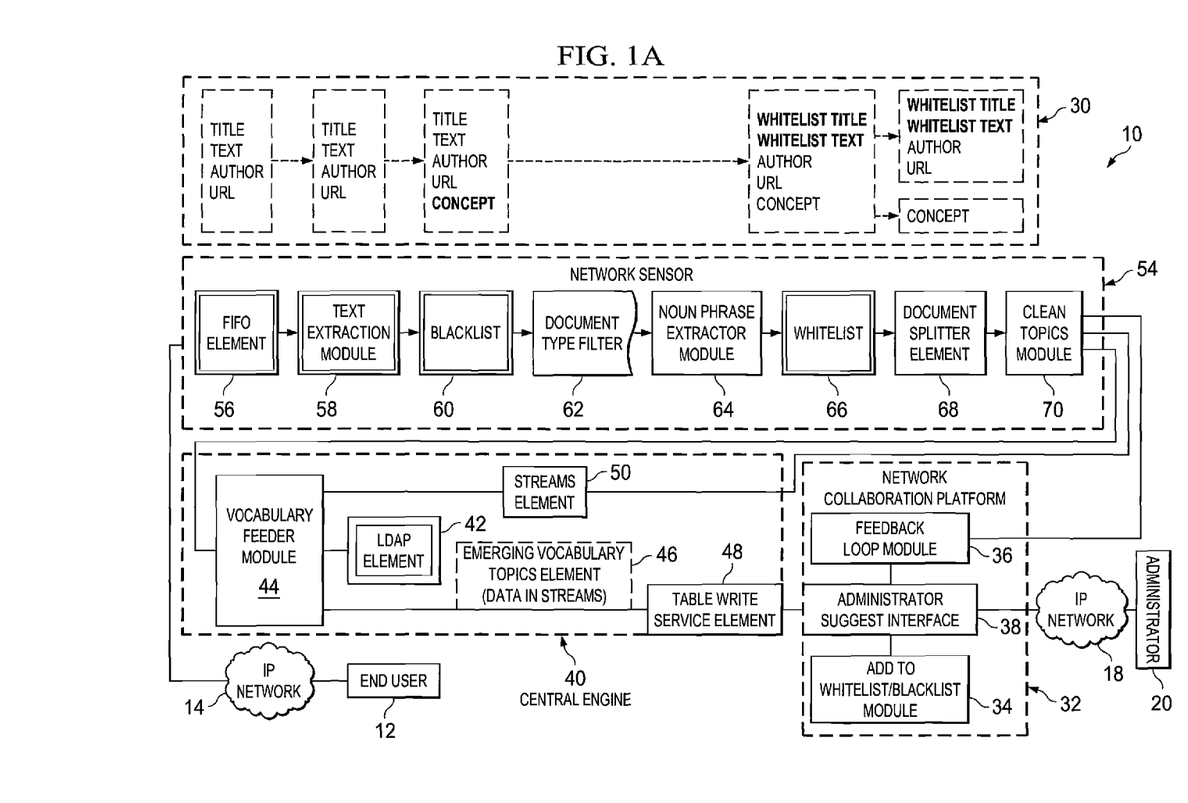
FIG. 1A is a simplified block diagram of a communication system for protecting privacy, while tagging information in a network environment in accordance with one embodiment.

FIG. 1A is a simplified block diagram of a communication system 10 for protecting privacy issues, while generating vocabulary from network data in accordance with one embodiment. FIG. 1A may include an end user 12, who is operating a computer device that is configured to interface with an Internet Protocol (IP) network 14. In addition, an administrator 20 is provided and has the ability to interface with the architecture through an IP network 18. Also provided in conjunction with FIG. 1A is an example workflow 30 that tracks a document (and its content) as it is received and intelligently processed through communication system 10. Communication system 10 may further include a network collaboration platform (NCP) 32, which includes an add to whitelist/blacklist module 34, a feedback loop module 36, and an administrator suggest interface 38. FIG. 1A may also include a central engine 40, which includes a lightweight directory access protocol (LDAP) element 42, a vocabulary feeder module 44, a streams element 50, an emerging vocabulary topics element 46, and a table write service element 48.

FIG. 1A may also include a network sensor 54 that includes a first in, first out (FIFO) element 56, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, etc.

Note that before turning to the example flows and the infrastructure of the present disclosure, a brief overview of privacy issues encountered by many end users is provided. In a network environment in which data is being monitored, the notion of 'privacy' involves the rights and obligations of individuals as their data is collected, processed, retained, disclosed, etc. Most systems that evaluate network traffic do so without prior knowledge and/or without ratification of the inspection activities (e.g., from the users of the system).

Privacy issues can become more serious when considering the sensitivity of certain information, as well when accounting for the visibility of this information to countless other individuals. Most employees in corporate environments have grown accustomed to deep packet inspections being conducted on their machines. However, this rational expectation by the individual only relates to business information being generated (e.g., work product being shared amongst employees). In a different arena, most employees periodically check personal accounts, personal email, etc. using corporate equipment, and this activity provides a new category of information being captured by a data monitoring system in the corporate workplace. It was not the intention of the corporate entity to inspect mundane personal emails between individuals, nor was it the objective of an enterprise to monitor individuals who may be surfing personal websites during their work breaks. Furthermore, if the system arbitrarily captures all data in the network, then this personal information may ultimately be viewed by colleagues, supervisors, and other individuals (e.g., outside the corporation). This inadvertent disclosure can present significant privacy dilemmas.

In many cases, privacy is specific to particular use cases, and not necessarily technology specific. A number of practical use cases (e.g., involving particular circumstances for an employee) are detailed below, where communication system 10 resolves these privacy dilemmas by employing various intelligent filtering operations. The features of communication system 10 can strike an effective balance between end-user privacy and the legitimate business objective of evaluating data propagating in the network. Communication system 10 can effectively tag an employee's email, HTTP traffic, etc. propagating in an enterprise network, but only when that information fits certain criteria, which respects the privacy of the end user. In one particular example, central engine 40 is responsible for initially evaluating whether the vocabulary capturing activities have been authorized by the implicated end user. This could take the form of a login operation in which an end user would be queried for permission associated with a privacy policy of the enterprise. If the privacy statement were approved by the end user, then the captured data could be sent to network sensor 54 for further processing. In terms of giving proper notice, the architecture can be configured to provide timely and effective notices of information gathering practices in the workplace. One or more user agents (e.g., a software tool) can be configured to offer effective tools for users to access these notices and make decisions based on them. For example, in a software implementation, simply checking one or more boxes could indicate an acquiescence by the end user of the data monitoring policy being employed by the enterprise. Other examples could involve a written signature, a verbal ratification, etc.

Communication system 10 can be configured to collect only relevant business data (once the end user has agreed to the terms associated with the system evaluating his activities), while respecting the privacy issues associated with non-business related items. In one example implementation, communication system 10 can provide a mechanism that intelligently filters uniform resource locators (URLs), email domains, HTTP objects, blacklist words, etc., and their respective content and, subsequently, stores appropriate business vocabulary in a way that respects an individual's privacy. In one example, the tagged information can be stored as a one-way hash for security purposes.

In one example implementation, network sensor 54 can be configured to include a number of words, URLs, phrases, etc. (e.g., in whitelist 66), which are related to a valid business purpose. In addition, and in a reciprocating fashion, network sensor 54 may also include a number of words, URLs, phrases, etc. (e.g., in blacklist 60), which are not related to any type of business activity. The presence of a blacklisted term would cause the incoming data to be dropped and not evaluated by the system. The whitelisted information can be identified, evaluated, tagged, and stored in any suitable format. Note that the capabilities and features of communication system 10 are best understood in the context of several use case examples, which are provided below.

Before turning to those use cases, it should be noted that there are two mechanisms working in the architecture of communication system 10. One mechanism involves text stripping in which certain fields are separated, processed, and routed in the system. As an overlay to these operations (or in cooperation with them), certain components within communication system 10 can identify which documents should be processed in the system based on the privacy parameters configured in the system.

Focusing solely on the business vocabulary workflow technical aspects, one aspect of the architecture could involve a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Turning to the infrastructure of FIG. 1A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that central engine 40 and network sensor 54 can readily be part of a server in certain embodiments of this architecture. In one example implementation, central engine 40 and network sensor 54 are network elements that facilitate or otherwise help coordinate the vocabulary building and privacy operations, as explained herein. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Figure 1B:
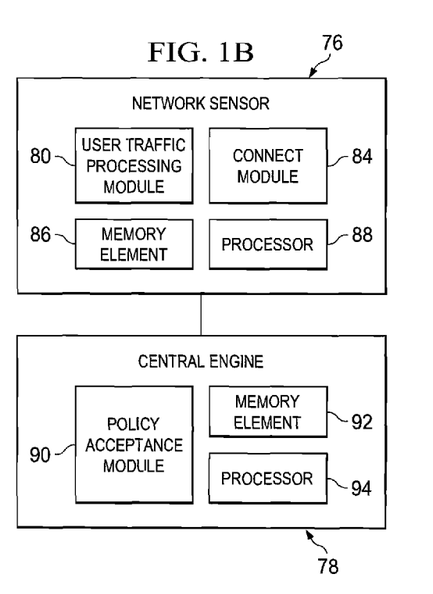
FIG. 1B is a simplified block diagram of example components that may be included within the communication system in accordance with one embodiment.

In one example implementation, central engine 40 and network sensor 54 include software (e.g., as part of a policy acceptance module 90 and/or a user traffic processing module 80 of FIG. 1B) to provide the vocabulary building and privacy features, as outlined herein in this document. In other embodiments, these features may be provided externally to any of the aforementioned elements, or included in some other network device to achieve this intended functionality.

Alternatively, several elements may include software (or reciprocating software) that can coordinate in order to achieve the operations, as outlined herein. In still other embodiments, any of the devices of FIG. 1A may include any suitable algorithms, hardware, software, components, modules, interfaces, or objects that facilitate these vocabulary building operations. Additional operational capabilities of communication system 10 are detailed below with respect to FIGS. 1B-4.

In operation of a first non-limiting example used for discussion purposes, a company can decide to purchase an architecture similar to that depicted in FIG. 1A. Additionally, in this example, the company has elected to deploy a data-monitoring model (e.g., firm wide) for its employees. In this particular example, a number of users are concerned about privacy issues associated with their network data. This can be resolved in a number of ways.

Continuing with this example, an end user opens a web browser and begins reviewing work materials, which are provided on a company Intranet. A quick determination is made as to whether this particular end user is on a list that includes him as part of the system. In this instance, the end user is part of the system, as verified on a registered user list. A second check is made as to whether the user has executed (or otherwise ratified) a privacy statement, which outlines how data monitoring will be conducted in this corporate environment. The delivery of this privacy statement can be done electronically such that when the user logs into his computer, or when he is issued his computer, he can review terms and conditions associated with his usage of the computer, the network, etc.

In this example, the user approves the privacy statement, and network sensor 54 can begin capturing information associated with data transmissions involving this particular end user. From a technical perspective, the architecture could be configured to parse sent emails from a user who is present within the system (e.g., based on an email domain check and based on user filtering). In addition, parsing of the content and tagging activities occur after an individual has logged in and accepted the privacy terms offered to the individual.

During a lunch break in this example, the end user opens a web browser and types in the following URL: www.yahoo.com. For several minutes, the end user searches through this website in hopes of finding a movie review, which he is seeking. Network sensor 54 can routinely check words, URLs, HTTP objects, etc. in order to verify whether the system is permitted to capture any of this information. Network sensor 54 identifies this particular website as an item that is forbidden from being monitored. Because this website is restricted from business monitoring (e.g., found in a URL blacklist), any packet or datagram associated with this particular flow would be dropped and not further processed by the system. [Note that more detailed discussions are provided below in describing how each whitelist and blacklist can be configured. These discussions are provided in conjunction with the example workflows of FIGS. 2-4.]

Continuing with this example, the user closes his web browser, and types a brief email to one of his colleagues about a particular product line being developed. In this instance, the product line relates to optical switching. Network sensor 54 monitors this email and identifies the terms "optical switching" as being included in whitelist 66. This information is effectively captured and tagged. In one example, the tagged data may be suitably associated with this particular end user, categorized in a subject matter file, or characterized in any other suitable manner. In essence, this brief example illustrates how communication system 10 can effectively carry out its data monitoring business functions, while respecting privacy issues associated with individual employees. It should also be noted that the business objectives have not been compromised; network data is still being effectively captured, tagged, and organized, but only for words, phrases, etc. that serve a valid business purpose. Note that there are additional flows associated with different use cases provided below with reference to FIGS. 2-4. Before turning to those workflows, a number of additional use cases are highlighted.

As a fundamental matter, end users should not have their information tagged if they are not part of the system's designated user list. The user list reflects those individuals for which permission has been given for monitoring (e.g., via various components of the architecture). In addition, information should only be tagged if an end user accepts the terms and conditions of the monitoring behavior of the system. Thus, in one configuration, the system carries out two checks before traffic is evaluated for particular end users. First, an end user should exist on the system user list (e.g., be registered as someone targeted for data monitoring). Second, the user should give the system permission to monitor his network data. Note that as used herein in this Specification, the term 'ratification' is meant to encompass any type of approval, acquiescence, or affirmation of a thing, document, agreement, or object (e.g., in the context of data monitoring). Even though already deployed and activated, the system only begins processing user information for those end users who have ratified the privacy rules and boundaries outlined by the corporate entity.

In the case where an end user is accessing company information (e.g., using a company machine/laptop), traffic is only tagged if it is emanating from the enterprise network in accordance with one configuration. In addition, in accordance with one example, data lying locally on the user's desktop is not tagged. In one system set up, only email, URL, and HTTP options are made available for tagging purposes. A company administrator may select to tag these items, other items, or fewer items: all of which may be based on particular administrative needs.

Additionally, besides controlling the various modes of communication, the architecture can control the number of domains being monitored. In one example implementation, the system tags only enterprise email domains, enterprise websites, and any type of corporate Intranet. Email domains such as gmail.com, hotmail.com etc. are not tagged: unless the administrator configures the system to do such tagging. In addition, external websites such as www.cnn.com, www.google.com, www.yahoo.com, etc. are not subject to tagging because they are (typically) not business-related sites. Thus, an end user is free to visit such websites without fear of being monitored by a corporate entity. In terms of corporate Intranets, certain employee links (e.g., paycheck information, employee benefits, performance reviews, etc.) are confidential and, therefore, would not be tagged. In order to intelligently remove these links from monitoring activities, a restricted URL list can be maintained for systematic consultation such that data associated with these URLs (even if captured) is dropped.

In another use case in which an employee uses work email to send various personal emails, the corporate entity would respect this boundary and not tag any of this data. Even when the architecture tags enterprise emails, only a portion of that email is saved. In essence, whenever the system identifies an email or an HTML page coming from a registered user (i.e., who has allowed the system to tag his/her information through a policy agreement), certain business related terms are kept, while the remaining portions are discarded.

Thus, in an example involving two end users speaking about a non-business related subject (e.g., basketball or cooking), the architecture would not process this exchange at any higher level because it would have already been discarded. In essence, if the document being received (or sent) fails to include business-related terms, the email, the HTML page, etc. has little significance to the system. One objective of the architecture is to readily identify expertise in a given area based on collected data and, further, to enhance business processes (e.g., searching for particular subject matter areas) that would otherwise consume hours of valuable time in searching for people to solve certain business-related problems. In terms of the email aspect of the architecture, the system can be designed to quickly discard non-business related words, process only relevant terms, and then subsequently discard the original email. Because emails are not stored indefinitely, the corporate entity may (indirectly) reduce their obligations in terms of legal proceedings, which may involve subpoenas asking for complete database records for every email exchanged during a given time interval.

In a use case involving a supervisor having a number of direct reports, some of the work email sent out could have confidential information related to salaries, promotions, government projects, etc. This is sensitive and classified data, which should not be made public. Much like the way in which a restricted domain would be used, where the system allows an administrator to specify the domains that are immune from tagging, a restricted term list could be developed. The restricted term list would allow the system to identify terms that may be related to the business, but which are also confidential and, therefore, should not be ultimately tagged. In one example implementation, by including terms such as 'confidential', 'promotion', 'salary', etc. in this restricted list, the architecture can ensure that sensitive information is neither tagged nor disclosed.

In another use case, after the system associates an individual with an area of expertise, there are certain options provided in the system that allow flexibility in how new business issues are evaluated. For example, individuals returned as experts by the system can be introduced to the concept of zero, single, and double blind protocols. The zero blind protocol would allow both a help seeker and a help provider to be aware of each other's identity. This reflects an open system. In a single blind protocol, a one-way approach is offered, where either one of the users can elect to make himself/herself identifiable. In a double blind protocol, neither party is aware of each other's identity. This reflects a closed system of complete anonymity between the users.

In another use case, where someone maliciously hacks into the architecture and attempts to read information collected about various individuals, that type of unauthorized activity is minimized because of the inherent storage protocol, which can be employed by the architecture. In one example, information can be maintained about each user (e.g., including names and lists of randomly ordered terms to which each individual user is associated); however, there are no sentences or structured expressions stored. Thus, even if the system is compromised, the data within the system is saved in a secure (e.g., a hash) format. In one example, the system is configured to store encrypted data, which is not saved in any type of human-readable format. Other instances could allow the architecture to be configured to store human-readable phrases, documents, etc. It is the option of the administrator to configure the system based on his/her particular business needs.

Turning to FIG. 1B, FIG. 1B is a simplified block diagram of one example implementation of communication system 10. In this particular implementation, a network sensor 76 includes a user traffic processing module 80, a connect module 84, a memory element 86, and a processor 88. In addition, FIG. 1B includes a central engine 78, which includes a policy acceptance module 90, a memory element 92, and a processor 94. The operations of these components are best explained in the context of a simplified example used for discussion purposes only.

In operation of a particular example, a document can be created and sent along a network pathway in a corporate network environment (e.g., destined for an individual within an enterprise). As a packet associated with the document is received by the system, a check is performed to verify whether the packet is coming from a user who has permitted/authorized the system to tag his/her information. Packets emanating from unregistered users are not tagged. A second verification can involve evaluating whether the user has ratified some type of data monitoring policy. These verifications can involve policy acceptance module 90, which is provided at central engine 78. Once policy acceptance module 90 verifies the author's registered status (potentially along with the status of a recipient of the document), the document can be sent to network sensor 76 of the system for further processing. In one instance, any of the following operations (or all of the operations) may be performed by user traffic processing module 80, which may include any number of components (such as those depicted by FIG. 1A).

After passing the preliminary checks, the next check is to identify the type of packet associated with this particular flow. For example, this packet could be associated with an HTTP object, email, etc. If the packet is HTTP, a check is performed to evaluate whether it is part of a restricted URL domain. A business restricted URL domain can contain those domains that are outside the business activities associated with this particular enterprise. If the packet does belong to this domain, the packet is dropped. If this is not the case, the subsequent step is to verify the packet against business approved URL domains. For example, if the architecture were deployed at Home Depot, www.homedepot.com would be an acceptable URL, where other types of entertainment sites would not be part of that same approved URL domain. If the packets belong to the approved business URL domain list, then the analysis continues to the next level of the system. [Note that these activities discussed above and below collectively form a decision tree in which certain conditions should be satisfied before the document moves to the next step in the analysis.]

If the packet does not involve an HTTP flow, then a different type of check would be performed for an email being exchanged between individuals. For example, the system can tag those exchanged packets that are part of the approved business email domain list. This email list can include (in the above enterprise example) email domains such as homedepot.com, warehouselumber.com (i.e., a business partner), but the list would not implicate domains such as hotmail.com, gmail.com, etc. An additional check for email data is done to verify if the sender and the receiver are both registered in the system. In one example, if one of the receivers of the email does not belong to the system policy, then the data is discarded.

Once the system sifts out the non-personal (business relevant) packets, a set of business related keywords can be extracted from that body of words. The rest of the information can simply be discarded. At the end of the particular process, the system can save a set of random business related words that a user may have used during his email communication. In addition, the system can save a hashed copy of this harvested information to ensure it is saved in a non-readable format (i.e., for security purposes).

In one example implementation, documents (i.e., words, phrases, etc.) are subsequently indexed, where they can be processed through an algorithm to derive expertise for each user subscribed to the system. In one example, searching for areas of expertise can involve connect module 84, which can offer a mechanism for intelligent searching of the captured business data. The data can be appropriately categorized in any suitable manner. The architecture discussed herein can continue to amass and aggregate business data in order to build subject matter areas and/or a personal vocabulary for each individual end user. The personal vocabulary can be partitioned such that each individual has his own group of tagged words (or people) to which he is associated. The subject matter areas and the personal vocabulary can continue to evolve as end users interact with each other about certain business topics.

Any of the components of FIGS. 1A-1B (e.g., memory elements 86, 92) can include an index database. In addition, an indexer mechanism can be configured to assist in categorizing the words (and/or noun phrases) collected in communication system 10. Those indices can be stored in the index database, which can be searched by a given administrator or an end user. Along similar reasoning, a topics database could be used to store words associated with particular topics identified within the personal vocabulary. Any of the memory elements of network sensor 76 and/or central engine 78 can store the resultant composite of vocabulary words (e.g., per individual), or such information can be stored in any other database, which may be configured or arranged based on particular needs. It is imperative to note that this example of FIG. 1B is merely representing one of many possible configurations of network sensor 76 and central engine 78. Other permutations are clearly within the broad scope of the tendered disclosure.

Note that the mechanisms discussed above provide layers of protection for ensuring the privacy of those having their data monitored. All of these options are configurable from the perspective of an administrator. Thus, various permutations associated with these described operations are clearly within the broad scope of the presented disclosure.

Turning to the technical operations for how data monitoring can be executed in communication system 10, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. Also, most search queries are noun phrases. Thus, knowing the location of the noun phrases within documents and, further, extracting them can be an important step for tagging applications. In operation of a simplified example used for discussion purposes, the extraction and processing operations can be performed on network sensor 76, where those results may be later provided to NCP 32, to a suitable administrator interface, etc.

For the end user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent over to central engine 40. The concept field can be accessible like other fields in the received/collected documents. The concept field is a list of string field values. Additional functionalities associated with these operations are best understood in the context of several examples provided below.

Setting aside the decision tree analysis that involves privacy issues, the following example focuses on technical aspects of the architecture. FIFO element 56 may receive data in a raw format. Text extraction module 58 may extract certain fields in order to identify a title, text, authorship, and a uniform resource locator (URL) associated with a particular document. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above.

The document is then passed to blacklist 60, which searches (i.e., evaluates) the document to see if any blacklisted words are found in the document. Any of the privacy operations detailed previously can be invoked at this juncture. If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 can perform a quick check of the type of document that is being evaluated. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." It should also be noted that in workflow 30 of FIG. 1A, the concept has been identified at this stage.

Once this document has propagated through noun phrase extractor module 64, the document passes to whitelist 66. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that in workflow 30, there are two documents being created from the original document. In one instance, document splitter element 68 can receive a document with five fields including the concept field, and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side). Vocabulary feeder module 44 forwards the document without the concept field and, for the document with the concept field, it sends it to streams element 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow above, vocabulary feeder module 44 can read the concept field (e.g., created by the NLP module) and can feed the noun phrases to the raw vocabulary stream (e.g., "raw_vocab_stream" file). The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms.

This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to network sensor 54 to copy over to a file (e.g., adminStopWords.txt). Network collaboration platform 32 can create a file from the table suggested vocabulary terms (e.g., via commands including suggestedby=system, and status=rejected). This file can be a part of the force sync files that can be pushed to the network sensor/central engine (depending on where the stop words mechanism resides). Emerging vocabulary topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

Figure 2:
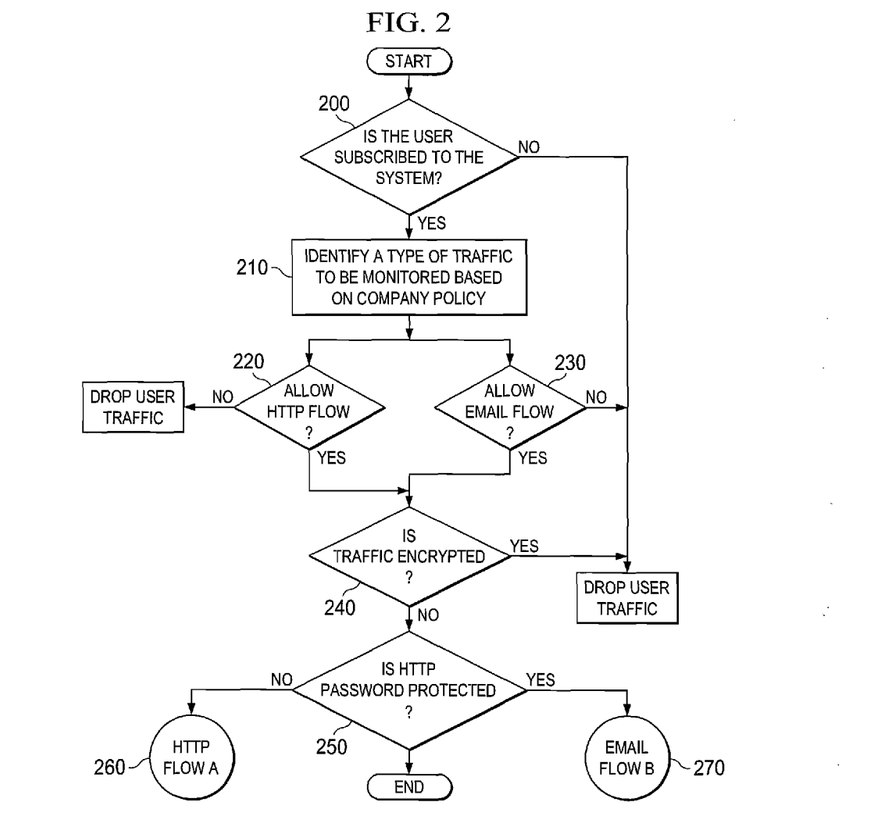
FIGS. 2-4 are simplified flowcharts illustrating a series of example steps associated with how data can be processed in the communication system.

FIG. 2 is a simplified flowchart illustrating an initial policy workflow associated with communication system 10. The flow may begin at step 200, where a query is provided as to whether the user is subscribed to the system. If the user is not subscribed, then the user traffic (or the data) is dropped. However, if the user is subscribed to the system, then the workflow moves to step 210, where the architecture can identify a type of traffic to be monitored based on a set of company policies. If the policy allows for the monitoring of an HTTP flow (shown at step 220), then the workflow can move to step 240, where a query is provided as to whether the traffic has been encrypted. In this instance, encrypted data is of no interest to the system and, therefore, if encrypted data is present, it is discarded. Additionally, if monitoring HTTP flows is prohibited in this system, then the user traffic would be dropped as shown in FIG. 2.

An additional query is also made in conjunction with step 220. In a separate query, an evaluation is made as to whether the monitoring of email flows is permitted in this particular configuration, which is shown by step 230. Again, if this is not the case then the user traffic is dropped. The workflow can move to step 250, where an evaluation is made as to whether the flow is HTTP password-protected. The workflow for FIG. 2 is extended at step 260 for an HTTP flow, and at step 270 for an email flow.

Figure 3:
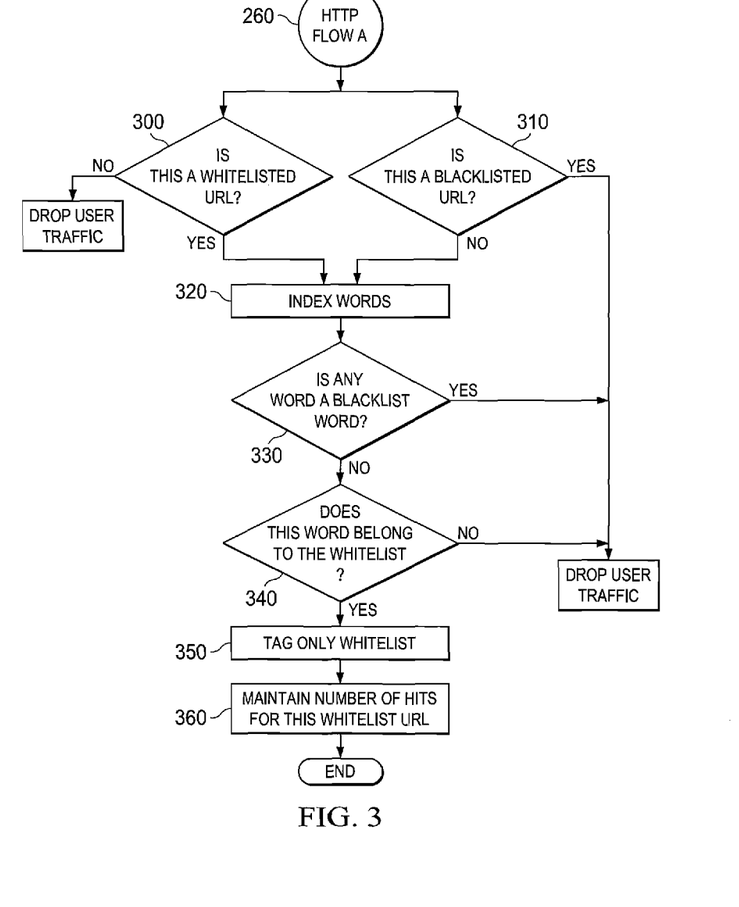

FIG. 3 is a simplified flowchart illustrating an HTTP policy workflow. FIG. 3 picks up at step 260, where the incoming data is evaluated as to whether a whitelisted URL is present at step 300. If the answer is no, then the user traffic is dropped. In a parallel fashion, an evaluation is made as to whether this data represents a blacklisted URL. This occurs at step 310. In this instance, if the data is part of a blacklisted URL, then the user traffic is dropped. At step 320, an index of words is provided to the system. At step 330, an evaluation is made as to whether any word found in the data is a blacklist word. If the answer is yes, then user traffic is dropped. If the answer is no, then the workflow continues to step 340, where an evaluation is made as to whether this word belongs to a whitelist. If the answer to this query is yes, then only the whitelisted words are tagged at step 350. At step 360, the system is configured to maintain a number of hits for a particular whitelisted URL.

Figure 4:
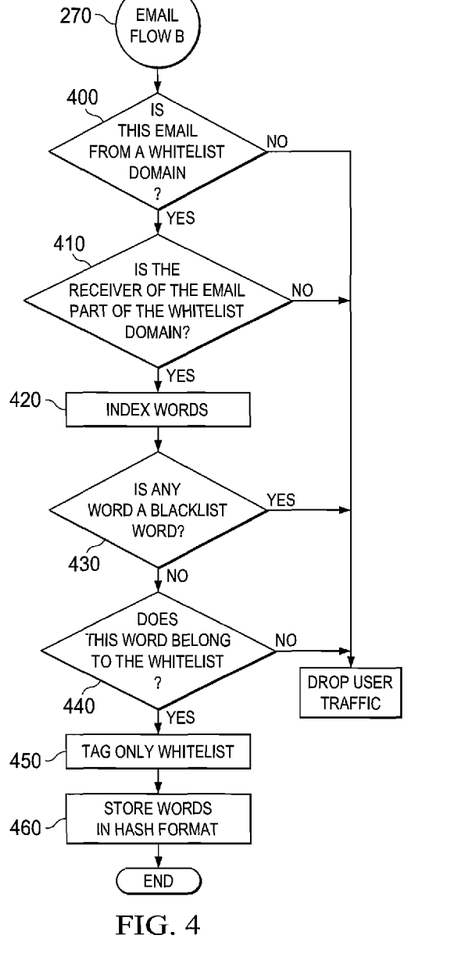

FIG. 4 is a simplified flowchart illustrating an email policy workflow. FIG. 4 continues from step 270, where a query is made as to whether this email stems from the whitelist domain. If this is not the case, then the user traffic is dropped. At step 410, a query is made as to whether the receiver of the email is part of the whitelist domain. If the answer is yes to this query, then the workflow moves to step 420, where an index of words is provided for this email. If any of the words appear in a blacklist, then at step 430, these words would be identified. If no words are identified as belonging to the blacklist, then another query evaluates whether the words belong to the whitelist; this is depicted by step 440. At step 450, only the whitelisted words are tagged. At step 460, the identified words are stored in a hash format.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building (while protecting privacy issues) can be provided at various locations. In one example implementation, this software is resident in a network element (e.g., which could include central engine 40 and/or network sensor 54), or in another network element for which this capability is relegated. In other examples, this could involve combining central engine 40 and/or network sensor 54 with an application server or a gateway, or some proprietary element, which could be provided in (or be proximate to) these identified network elements, or this could be provided in any other device being used in a given network. In one specific instance, central engine 40 provides the policy offering and acceptance activities explained herein, while network sensor 54 can be configured to offer the business vocabulary activities detailed herein. In such an implementation, central engine 40 can evaluate whether users belong to a registered list, or have adopted a data monitoring policy before the data is passed to network sensor 54 for processing the data.

In other embodiments, these features may be provided externally to network sensor 54 and/or central engine 40, or included in some other network device, or in a computer to achieve these intended functionalities. As identified previously, a network element can include software to achieve the vocabulary building operations, as outlined herein in this document. In certain example implementations, the vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein.

This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building operations as outlined herein. Additionally, each of these devices may include a processor that can execute software or an algorithm to perform the vocabulary building activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
   receiving data propagating in a network environment;
   verifying whether the data is associated with a first end user represented in a registered user list;
   verifying a ratification of a policy by the first end user that authorizes monitoring of e-mail traffic generated by the first end user;
   identifying selected words within the data based on a whitelist, wherein the whitelist includes a plurality of designated words to be tagged; and
   generating a resultant composite of the selected words that are tagged.

2. The method of claim 1, further comprising:
   verifying whether the data is associated with a business email domain, wherein if the data is associated with the business email domain, one or more words in the data are tagged.

3. The method of claim 1, further comprising:
   verifying whether the data is associated with a business uniform resource locator (URL) domain, wherein if the data is associated with the business URL domain, one or more words in the data are tagged.

4. The method of claim 1, further comprising:
   determining whether the data includes one or more terms of a restricted term list, wherein if the data includes any terms in the restricted term list, one or more words in the data are not tagged.

5. The method of claim 1, further comprising:
   determining whether the data includes one or more HTTP objects;
   consulting a privacy policy for a selected end user to verify if monitoring of HTTP objects is prohibited; and
   discarding the data.

6. The method of claim 1, further comprising:
   determining whether the data is encrypted; and
   discarding the data if the data is encrypted.

7. The method of claim 1, further comprising:
   determining whether the data is password protected; and
   discarding the data if the data is password protected.

8. Logic encoded in one or more non-transitory media that includes code for execution and when executed by a processor is operable to perform operations comprising:
   receiving data propagating in a network environment;
   verifying whether the data is associated with a first end user represented in a registered user list;
   verifying a ratification of a policy by the first end user that authorizes monitoring of e-mail traffic generated by the first end user;
   identifying selected words within the data based on a whitelist, wherein the whitelist includes a plurality of designated words to be tagged; and
   generating a resultant composite of the selected words that are tagged.

9. The logic of claim 8, the processor being further operable to perform operations comprising:
   verifying whether the data is associated with a business email domain, wherein if the data is associated with the business email domain, one or more words in the data are tagged.

10. The logic of claim 8, the processor being further operable to perform operations comprising:
    verifying whether the data is associated with a business uniform resource locator (URL) domain, wherein if the data is associated with the business URL domain, one or more words in the data are tagged.

11. The logic of claim 8, the processor being further operable to perform operations comprising:
determining whether the data includes one or more terms of a restricted term list, wherein if the data includes any terms in the restricted term list, one or more words in the data are not tagged.

12. The logic of claim 8, the processor being further operable to perform operations comprising:
determining whether the data includes one or more HTTP objects;
consulting a privacy policy for a selected end user to verify if monitoring of HTTP objects is prohibited; and
discarding the data.

13. The logic of claim 8, the processor being further operable to perform operations comprising:
determining whether the data is encrypted; and
discarding the data if the data is encrypted.

14. The logic of claim 8, the processor being further operable to perform operations comprising:
determining whether the data is password protected; and
discarding the data if the data is password protected.

15. An apparatus, comprising:
a memory element configured to store data;
a processor operable to execute instructions associated with the data; and
a policy acceptance module configured to interface with the memory element and the processor, the policy acceptance module being configured to:
receive data propagating in a network environment;
verify whether the data is associated with a first end user represented in a registered user list;
verify a ratification of a policy by the first end user that authorizes monitoring of e-mail traffic generated by the first end user; and
a user traffic processing module configured to:
identify selected words within the data based on a whitelist, wherein the whitelist includes a plurality of designated words to be tagged; and
generate a resultant composite of the selected words that are tagged.

16. The apparatus of claim 15, wherein the user traffic processing module is configured to:
verify whether the data is associated with a business email domain, wherein if the data is associated with the business email domain, one or more words in the data are tagged.

17. The apparatus of claim 15, further comprising:
a database configured to store the resultant data in a hashed format.

18. The apparatus of claim 17, wherein the database is configured to partition the resultant composite amongst a plurality of individuals associated with the data propagating in the network environment.

19. The apparatus of claim 15, wherein the user traffic processing module is configured to:
determine whether the data includes one or more HTTP objects;
consult a privacy policy for a selected end user to verify if monitoring of HTTP objects is prohibited; and
discard the data.

20. The apparatus of claim 15, wherein the user traffic processing module is configured to:
determine whether the data is encrypted; and
discard the data if the data is encrypted.

* * * * *